F. T. ROBERTS.
PROCESS FOR MAKING FILLERS FOR TIRES.
APPLICATION FILED NOV. 7, 1910.
1,012,161.
Patented Dec. 19, 1911.
2 SHEETS—SHEET 2.
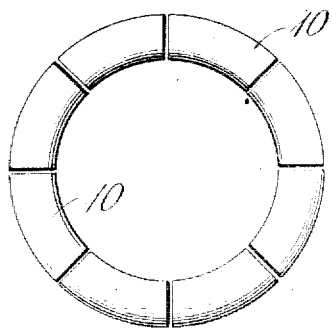
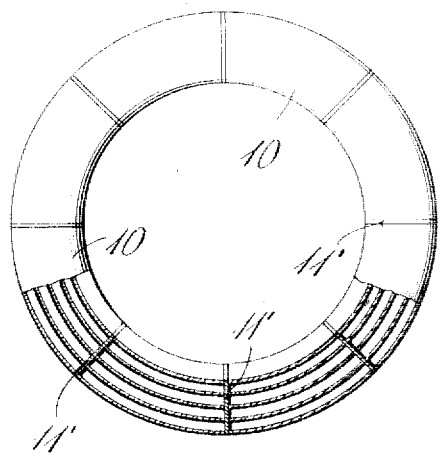
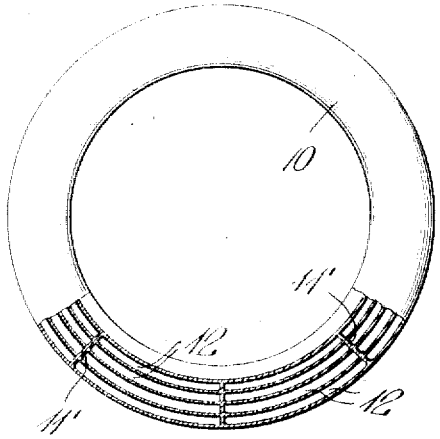
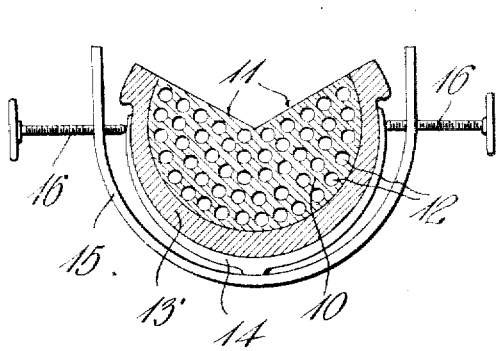
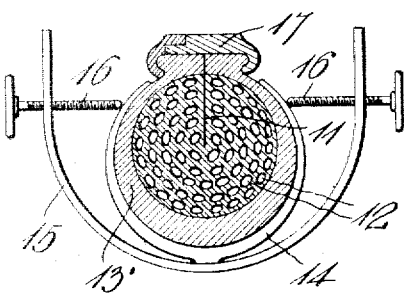
Inventor
F. T. Roberts
Witnesses

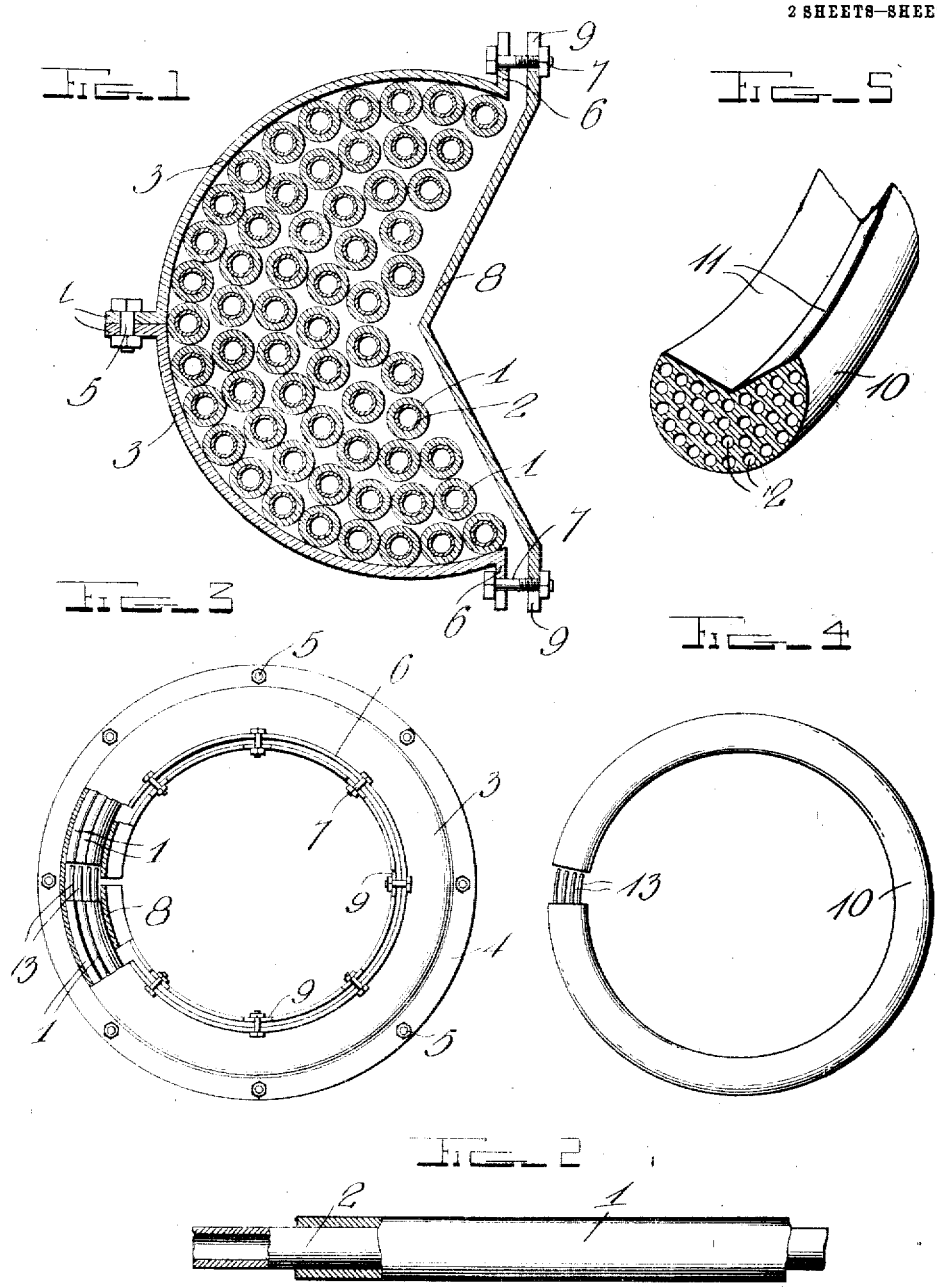

UNITED STATES PATENT OFFICE.

FRED T. ROBERTS, OF NEW YORK, N. Y.

PROCESS FOR MAKING FILLERS FOR TIRES.

1,012,161.    Specification of Letters Patent.    Patented Dec. 19, 1911.

Application filed November 7, 1910. Serial No. 591,107.

*To all whom it may concern:*

Be it known that I, FRED T. ROBERTS, a citizen of the United States, residing at New York, in the county of New York and State of New York, have invented certain new and useful Improvements in Processes for Making Fillers for Tires; and I do declare the following to be a full, clear, and exact description of the invention, such as will enable others skilled in the art to which it appertains to make and use the same.

My invention relates to a method or process for making tires and tire cores or fillers, such, for example, as set forth in my co-pending application Serial No. 602,015 filed January 10, 1911.

The object of the present invention is to provide a simple and practical process for producing tires or tire fillers from resilient porus material such as elastic rubber, and having a plurality of independent cells or chambers to contain compressed air or other gas which will coact with the elasticity of the rubber in producing a vehicle tire that will afford the same resiliency as the ordinary inflated inner tube tires.

With the above and other objects in view the invention consists in certain novel steps as will be more fully described and particularly pointed out in the appended claims.

In the accompanying drawings, Figure 1 is a cross sectional view through a portion of a vulcanizing mold used in the practice of my process; Fig. 2 is a detail view partly in section showing a rubber tube arranged on its sustaining element. Fig. 3 is a plan view of the mold shown in Fig. 1, parts being broken away and in section; Fig. 4 is a view showing the vulcanized filler after it is removed from the mold but before the sustaining elements or wires have been withdrawn from it. Fig. 5 is a sectional perspective view of the filler. Fig. 6 is a view of the filler cut into sections. Fig. 7 is a similar view of the filler with the transverse partitions arranged between its sections, parts being in section. Fig. 8 is a view similar to Fig. 7 showing the sections of the filler united with the transverse partitions whereby an integral filler body of annular form is provided with a longitudinal series of independent air-tight cells or chambers. Fig. 9 is a cross-sectional view through the filler or core showing it arranged in an ordinary tire casing and the latter arranged in a compressing device. Fig. 10 is a view similar to Fig. 9 showing the filler compressed in the tire casing and the rim closing the latter.

My improved filler or core for tires as illustrated in the accompanying drawings and set forth in my co-pending application comprises a one-piece annular body of elastic rubber made of sector shape in cross-section with its channeled or hollowed portion turned inwardly, and also having numerous air-tight cells or chambers which preferably extend longitudinally or circumferentially and are closed at intervals whereby such cells are arranged in series around the filler, the latter being made of sector shape in cross section, so that it may be compressed into circular nape or substantially circular shape in cross-section in a tire casing and the air in the air-tight cells or chambers will be compresed to make the tire a combined pneumatic and cushion tire. In producing this preferred form of filler or core, I take a plurality of rubber elements or tubes 1, which may be of cylindrical or other shape and arrange such tubes in a suitable mold and then vulcanize them to form a conglomerate body. In order to prevent the tubes 1 from collapsing while they are being vulcanized into a single body, I provide sustaining elements 2 in them, such elements being preferably flexible wires or tubes which may be made of lead, copper or other material of sufficient flexibility to allow them to be readily withdrawn from the vulcanized or molded article. To further assist in the ready removal of the elements or wires 2, they are covered with talc or other material that will prevent the rubber tubing from adhering to them.

A sufficient number of the tubes 1 containing their sustaining elements 2 are placed in the combined mold and vulcanizing chamber which may be of any shape according to the shape it is desired to give to the filler. However, I preferably mold or vulcanize in one piece a sufficient length of material to make one complete filler or core and, consequently, make the mold or core of annular shape as shown in Figs. 1 and 3. This mold is preferably made of two half sections 3 having their outer edges provided with flanges 4 which are detachably united by bolts or analagous fasteners 5. The inner edges of the mold sections 3 are formed with outturned flanges 6, which latter are notched at intervals to receive screws, bolts or other pressure exerting devices 7 whereby a cover section 8 for the mold may be drawn tight upon the inner edges of the body sections 3 of the mold to compress the tubes 1, just prior to carrying out the vulcanizing operation. The third or cover section 8 of the mold is of divided circular shape and its out-turned flanges are formed with elongated recesses or slots 9 whereby said cover section may slide on the bolts 7 in expanding to enter and close the body of the mold. The cover section 8 is also preferably made V-shaped in cross section as clearly shown in Fig. 1, so that the molded or vulcanized filler 10 will have a body of sector shape in cross-section. The preferred shape of this molded or vulcanized filler body is clearly shown in Fig. 5 upon reference to which it will be noted that its V-shaped channeled portion is turned inwardly and composed of flat faces 11 which converge toward the center of the filler.

When the plurality of rubber tubes 1 are placed in the mold, the sustaining elements 2 are allowed to project slightly from one end as shown at 13 in Fig. 3. After a sufficient number of tubes have been placed in the mold the cover section 8 is screwed down tight on the body sections and the entire mold placed in a suitable vulcanizing apparatus. After the vulcanizing operation the molded or vulcanized body 10 of the filler is removed from the mold in the form shown in Fig. 4 and in removing the sustaining elements or wires 2, said body 10 is straightened as much as possible and the wires 2 drawn out by any suitable means so as to leave continuous air cells running longitudinally or circumferentially through the filler. After the elements or wires 2 have been withdrawn from the filler it is divided in a plurality of arcuate sections as shown in Fig. 6 and between the opposing ends of each two adjacent sections I then arrange a partition 11'. The partitions 11' are preferably made of sheets of rubber and are united to the abutting ends of adjacent sections by an acid cure process or any other means whereby an integral or one piece annular filler is produced. This completed filler or core is illustrated in Fig. 8, on reference to which it will be noted that it contains a number of separate or independent series of longitudinally extending air-tight air cells or chambers 12, the air in which will be compressed when the filler or core is compressed in the tire casing.

As shown in Fig. 9, the distended filler is made of greater diameter than the internal diameter of the closed tire casing so that when the latter is closed the filler will be compressed as shown in Fig. 10. In order to close the tire casing, which latter is indicated at 13' in Fig. 9, it is placed in a compressing device after the filler has been placed in it. This compressing device comprises a resilient member 14 arranged in the U-shaped support 15 which latter carries pressure-exerting screws 16 to bear against the resilient end portions of the compressing member 14, whereby said end portions will press the two side edges of the tire inwardly and at the same time compress the entire filler or core 10 so as to bring the flat faces 11 of its channeled portion in contact, as clearly shown in Fig. 10. After the tire casing is closed a rim 17 of ordinary construction is applied to the casing to retain it in its closed position, it being noted that the expansive action of the filler will tend to hold the tire casing in the rim the same as an ordinary inflated pneumatic inner tube.

From the foregoing it will be seen that by means of my improved process my pneumatic filler or core may be readily produced at a small expense and that the filler, owing to its peculiar construction, will be an effective substitute for the inflated inner tube of a pneumatic tire. The formation of the filler from elastic rubber and making it with air-tight cells or chambers and of sector-shape in cross-section so that it will be compressed when placed in the tire or tire-casing, produces in combination with the tire-casing, a combination pneumatic and cushion tire, because the compression of the air in the air cells will coöperate with the elasticity of the rubber in giving the tire the desired resiliency. Furthermore, the formation of the filler as set forth, produces a device that will not only have all the advantages of the inflated pneumatic tire, but which will also be free from the objections to such tires, such for instance as blow-outs, leaking valves, etc.

While I have shown and described in detail the preferred embodiment of my invention and the preferred method of producing the same, I wish it understood that changes and variations may be resorted to within the spirit and scope of my invention.

I claim:

1. The herein described process which comprises the distention of a plurality of hollow rubber bodies by means of withdrawable fillers inserted in the openings and extending through the bodies, assembling such bodies and fillers in juxtaposition, vulcanizing the bodies thus assembled and distended, and withdrawing the fillers.

2. The herein described process which comprises the distention of a plurality of hollow rubber bodies by means of withdrawable fillers inserted in the openings and extending through the bodies therein, assembling such bodies and fillers in juxtaposition, vulcanizing the bodies thus assembled and distended, withdrawing the fillers and sealing the openings.

3. The herein described process which comprises the distention of a plurality of hollow rubber bodies by means of withdrawable fillers inserted in the openings and extending through the bodies, assembling such bodies and fillers in juxtaposition, vulcanizing the bodies thus assembled and distended, withdrawing the fillers, sealing the openings, and compressing the inclosed air.

4. The herein described process which comprises the distention of a plurality of hollow rubber bodies by means of withdrawable fillers inserted in the openings and extending through the bodies, assembling such bodies and fillers in juxtaposition, vulcanizing the bodies thus assembled and distended, withdrawing the fillers, dividing the vulcanized body into sections, and sealing and connecting said sections.

5. The herein described process which comprises the distention of a plurality of hollow rubber bodies by means of fillers inserted in openings therein, assembling such bodies and fillers in juxtaposition, vulcanizing the bodies thus assembled and distended, withdrawing the fillers, dividing the vulcanized body into sections, sealing and connecting said sections and compressing the air in the sections.

6. The herein described process which comprises the distention of a plurality of hollow rubber bodies by means of fillers inserted in openings therein, assembling such bodies and fillers in juxtaposition, vulcanizing the bodies thus assembled and distended, withdrawing the fillers, dividing the vulcanized body into sections, sealing and connecting said sections and compressing the air in the sections by reducing their cross sectional area.

7. The herein described process which comprises the distention of a plurality of hollow rubber bodies by means of fillers inserted in openings therein, assembling such bodies and fillers in juxtaposition, vulcanizing the bodies thus assembled and distended, withdrawing the fillers, dividing the vulcanized body into sections, sealing and connecting said sections, and simultaneously compressing the air in all of the sections.

8. The herein described process which comprises the distention of a plurality of hollow rubber bodies by means of fillers inserted in openings therein, assembling such bodies and fillers in juxtaposition, vulcanizing the bodies thus assembled and distended, withdrawing the fillers, dividing the vulcanized body into sections, separating adjacent sections by inserting partitions between them, and subjecting the sections and inclosed partitions to treatment which will seal the openings of the sections and secure the sections and partitions together.

9. The herein described process which comprises the distention of a plurality of rubber tubes by means of withdrawable fillers inserted in and extending through the tubes, assembling such distended tubes in lateral juxtaposition, vulcanizing the assembled and distended tubes, and withdrawing the fillers therefrom.

10. The herein described process which comprises the distention of a plurality of rubber tubes by means of withdrawable fillers inserted in and extending through the tubes, assembling such distended tubes in lateral juxtaposition, vulcanizing the assembled and distended tubes, withdrawing the fillers therefrom, sealing the tubes, and compressing the air therein.

11. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, and sealing and connecting the ends of said sections.

12. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, sealing and connecting the ends of said sections, and compressing the air in the sections.

13. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, sealing and connecting the ends of said sections, and compressing the air in the sections by reducing the cross-sectional area thereof.

14. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, sealing and connecting the ends of said sections, and simultaneously compressing the air in all of the sections.

15. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, inserting partitions between adjacent sections, and subjecting the sections and inserted partitions to treatment which will unite them and seal the openings in the ends of the sections.

16. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, inserting partitions between adjacent sections, subjecting the sections and inserted partitions to treatment which will unite them and seal the openings in the ends of the sections and compressing the air in the united sections.

17. The herein described process which comprises the distention of a plurality of rubber tubes by means of fillers inserted in the ends thereof, assembling such distended tubes in lateral juxtaposition, vulcanizing the assembled and distended tubes, withdrawing the fillers therefrom, dividing the vulcanized body transversely into sections, inserting partitions between adjacent sections, subjecting the sections and inserted partitions to treatment which will unite them and seal the openings in the ends of the sections, and compressing the air in the united sections by reducing their cross-sectional area.

18. The herein described process which comprises the distention of a plurality of hollow rubber bodies by means of flexible withdrawable fillers inserted therein and extending therethrough, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold and withdrawing the flexible fillers from the body.

19. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, sealing the openings, and compressing the inclosed air.

20. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, sealing the openings, and compressing the inclosed air by reducing the cross-sectional area of the inclosing body.

21. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, dividing the vulcanized body into adjacent sections, and sealing and connecting said sections.

22. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, dividing the vulcanized body into adjacent sections, sealing and connecting said sections, and compressing the air inclosed in the sections.

23. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, dividing the vulcanized body into adjacent sections, sealing and connecting said sections, and simultaneously compressing the air in all of the sections.

24. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, dividing the vulcanized body transversely into sections, inserting partitions between adjacent sections, and subjecting the sections and inserted partitions to treatment which will unite them and seal the openings in the ends of the sections.

25. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, dividing the vulcanized body transversely into sections, inserting partitions between adjacent sections, subjecting the sections and inserted partitions to treatment which will unite them and seal the openings in the ends of the sections, and compressing the air in the united sections.

26. The herein described process which comprises the distention of a plurality of hollow rubber bodies by means of flexible fillers inserted therein, assembling the distended bodies with the inclosed fillers, in juxtaposition in a mold or former, the flexibility of the fillers permitting of the accurate accommodation of the assembled bodies to the form of the mold, vulcanizing the distended and formed up assemblage while in the mold, removing the vulcanized body from the mold, withdrawing the flexible fillers from the body, dividing the vulcanized body transversely into sections, inserting partitions between adjacent sections, subjecting the sections and inserted partitions to treatment which will unite them and seal the openings in the ends of the sections, and compressing the air in the united sections by reducing their cross-sectional area.

27. The herein described process which comprises the distention of a plurality of rubber tubes by the insertion therein of withdrawable fillers extending through the tubes, assembling the distended tubes in lateral juxtaposition in a body sector shaped in cross-section, vulcanizing the assembled tubes into a body of said sector shape, removing the fillers, sealing the openings, and compressing the contained air.

28. The herein described process which comprises the distention of a plurality of rubber tubes by the insertion therein of fillers, assembling the distended tubes in lateral juxtaposition in a body sector shaped in cross-section, vulcanizing the assembled tubes into a body of said sector shape, removing the fillers, sealing the openings, and compressing the contained air by changing the vulcanized body to circular form in cross-section.

29. The herein described process which comprises the distention of a plurality of rubber tubes by the insertion therein of fillers, assembling the distended tubes in lateral juxtaposition in a body of the cross-sectional form of a circle having a sector of less than a semi-circle removed therefrom, vulcanizing the assembled tubes, removing the fillers, and changing the transverse sectional form of the vulcanized body to that of a circle of reduced area.

30. The herein described process which comprises the distention of a plurality of rubber tubes by the insertion therein of withdrawable fillers extending through the tubes, assembling the distended tubes in lateral juxtaposition in a body of the cross-sectional form of a circle having a sector of less than a semi-circle removed therefrom, vulcanizing the assembled tubes, removing the fillers, sealing the openings, and compressing the contained air.

31. The herein described process which comprises the distention of a plurality of rubber tubes by the insertion therein of fillers, assembling the distended tubes in lateral juxtaposition in a body of the cross-sectional form of a circle having a sector of less than a semi-circle removed therefrom, vulcanizing the assembled tubes, removing the fillers, dividing the vulcanized body transversely into sections, sealing the openings in the ends of the sections, and compressing the contained air.

32. The herein described process which comprises the distention of a plurality of rubber tubes by the insertion therein of fillers, assembling the distended tubes in lateral juxtaposition in a body of the cross-sectional form of a circle having a sector of less than a semi-circle removed therefrom, vulcanizing the assembled tubes, removing the fillers, dividing the vulcanized body transversely into sections, sealing the openings in the ends of the sections, and compressing the contained air by changing the transverse sectional form of the vulcanized body to that of a circle of reduced area.

33. The herein described process which comprises the distention of a plurality of rubber tubes by the insertion therein of fillers, assembling the distended tubes in lateral juxtaposition in a body of the cross-sectional form of a circle having a sector of less than a semicircle removed therefrom, vulcanizing the assembled tubes, removing the fillers, dividing the vulcanized body into sections, inserting partitions between adjacent sections, sealing the sections and partitions together, and compressing the contained air.

34. The herein described process which comprises the distention of a plurality of rubber tubes by the insertion therein of fillers, assembling the distended tubes in lateral juxtaposition in a body of the cross-sectional form of a circle having a sector of less than a semi-circle removed therefrom, vulcanizing the assembled tubes, removing the fillers, dividing the vulcanized body into sections, inserting partitions between adjacent sections, sealing the sections and partitions together, and compressing the contained air by changing the transverse sectional form of the united and sealed sections to that of a circle of reduced area.

35. The herein described process which comprises the distention of a plurality of rubber tubes by the insertion therein of fillers, assembling the distended tubes in lateral juxtaposition in a body of the cross-sectional form of a circle having a sector of less than a semi-circle removed therefrom, vulcanizing the assembled tubes, removing the fillers, sealing the openings, inserting the vulcanized body into a tire casing, and compressing the tire casing and inclosed vulcanized body transversely until the edges of the casing meet, bringing the cross-sectional form of the vulcanized body to that of a circle of reduced area.

In testimony whereof I have hereunto set my hand in presence of two subscribing witnesses.

FRED T. ROBERTS.

Witnesses:
  OTTO HORWITZ,
  FREDERICK WIRNER.